(No Model.) 5 Sheets—Sheet 1.

W. W. EVANS.
TYPE WRITING MACHINE.

No. 445,398. Patented Jan. 27, 1891.

Witnesses
H. H. Lamb
R. E. S. Wiltberger

Inventor
W. Warrington Evans
Frankland James
Attorney (No Model.) 5 Sheets—Sheet 2.
W. W. EVANS.
TYPE WRITING MACHINE.
No. 445,398. Patented Jan. 27, 1891.
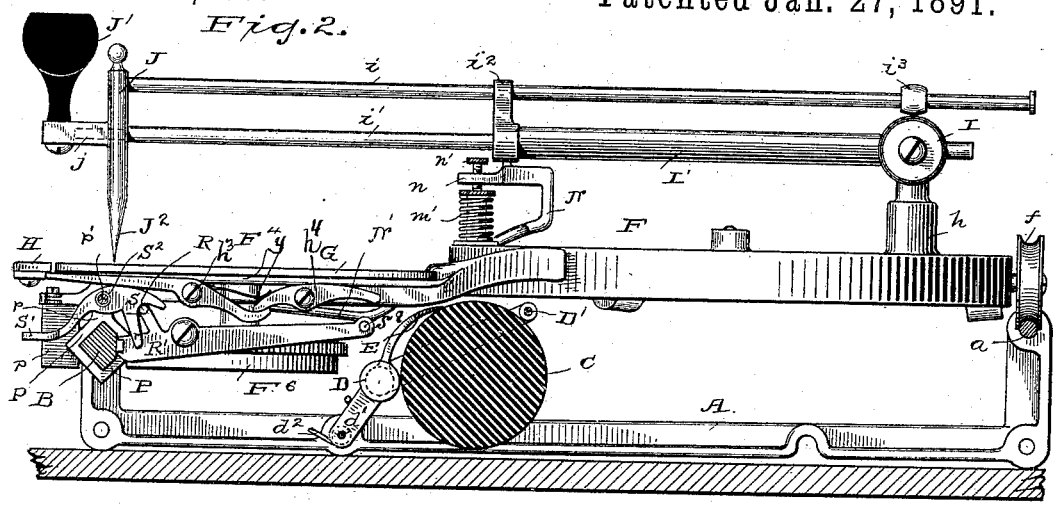
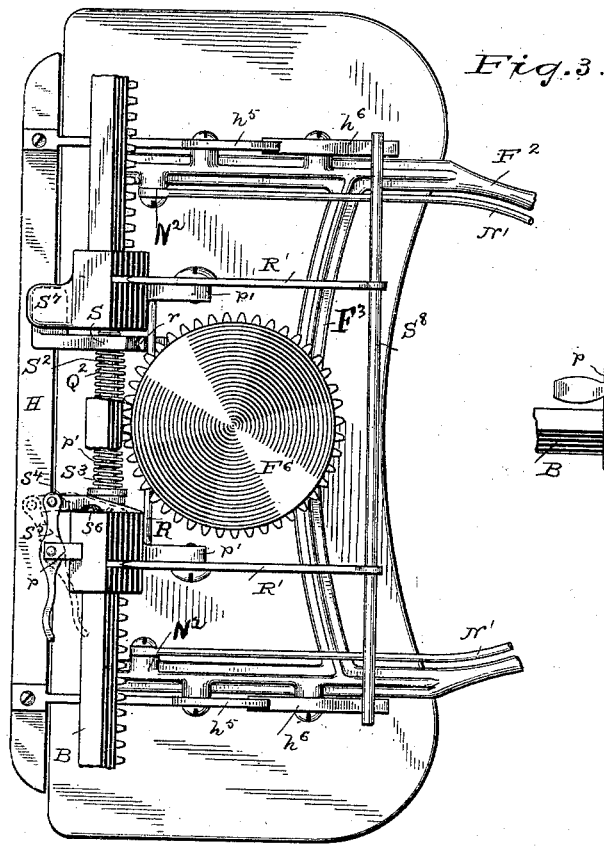
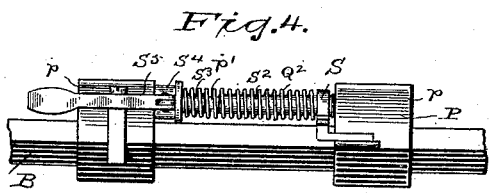
Witnesses
H. A. Lamb
R. E. Wiltberger
Inventor
W. Warrington Evans
Frankland Jannus
Attorney

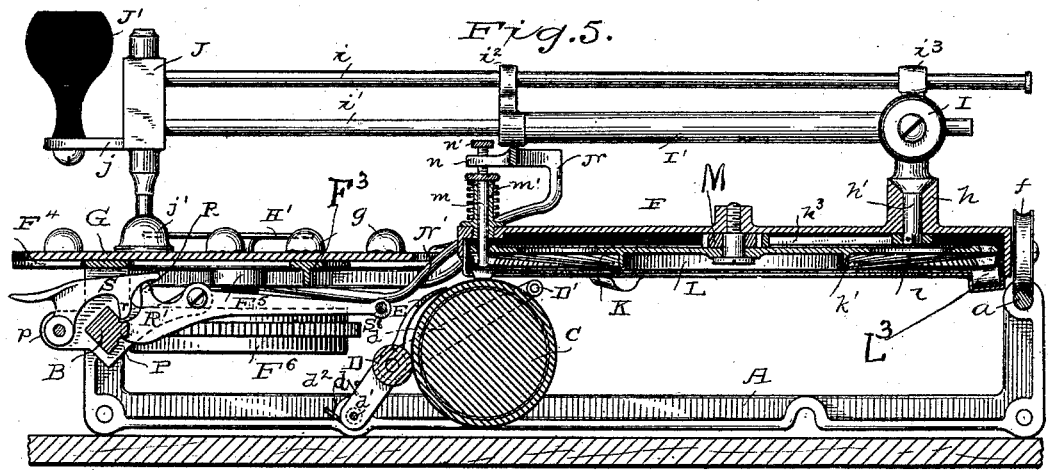
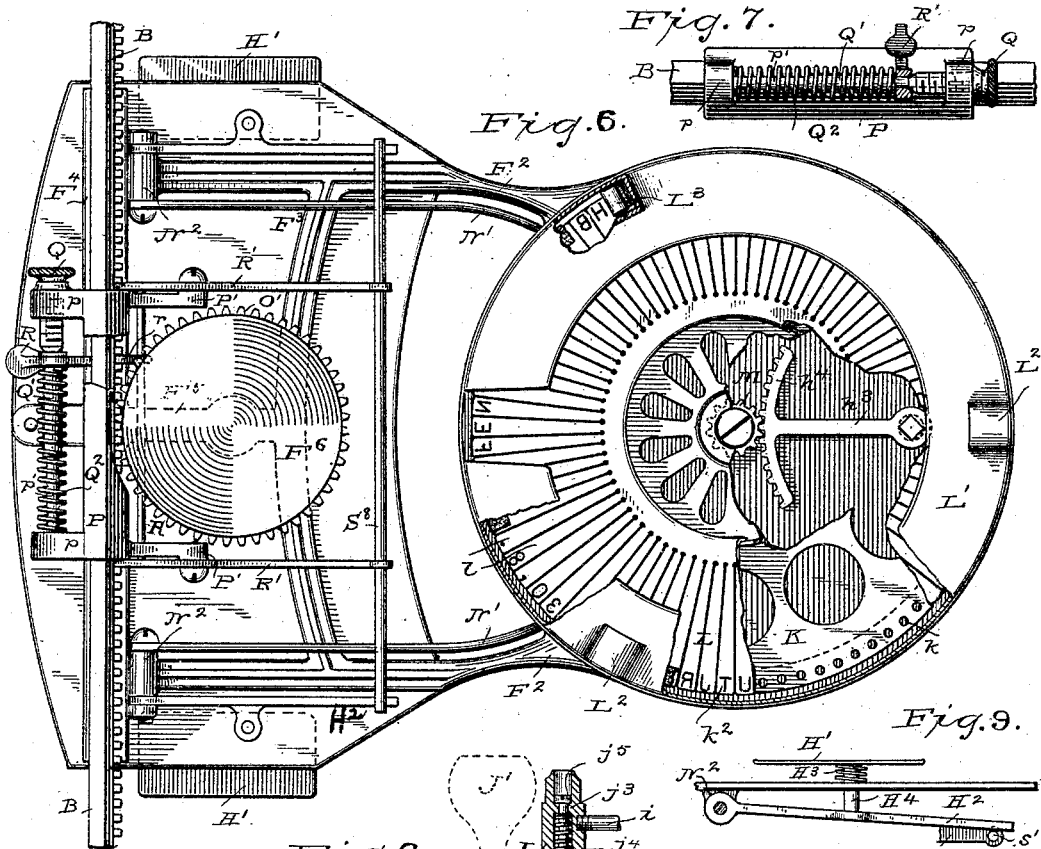
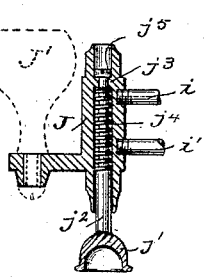

(No Model.)　　　　　　W. W. EVANS.　　　5 Sheets—Sheet 4.
TYPE WRITING MACHINE.

No. 445,398.　　　　　　　　Patented Jan. 27, 1891.

Witnesses
H. H. Lamb
C. L. Sturtevant

Inventor
W. Warrington Evans
By his Attorney
Frankland James (No Model.)
W. W. EVANS.
TYPE WRITING MACHINE.
No. 445,398.　　　　　　　　Patented Jan. 27, 1891.
5 Sheets—Sheet 5.
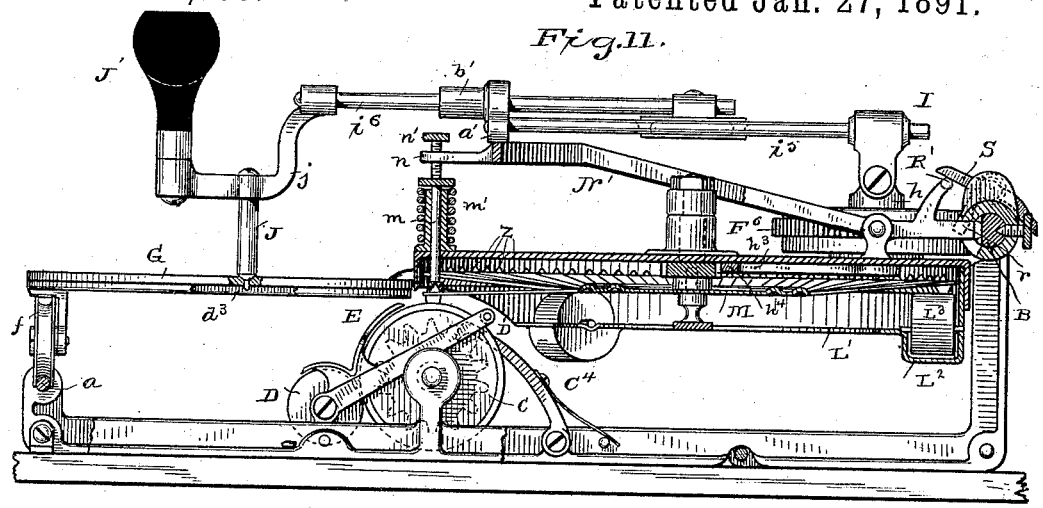
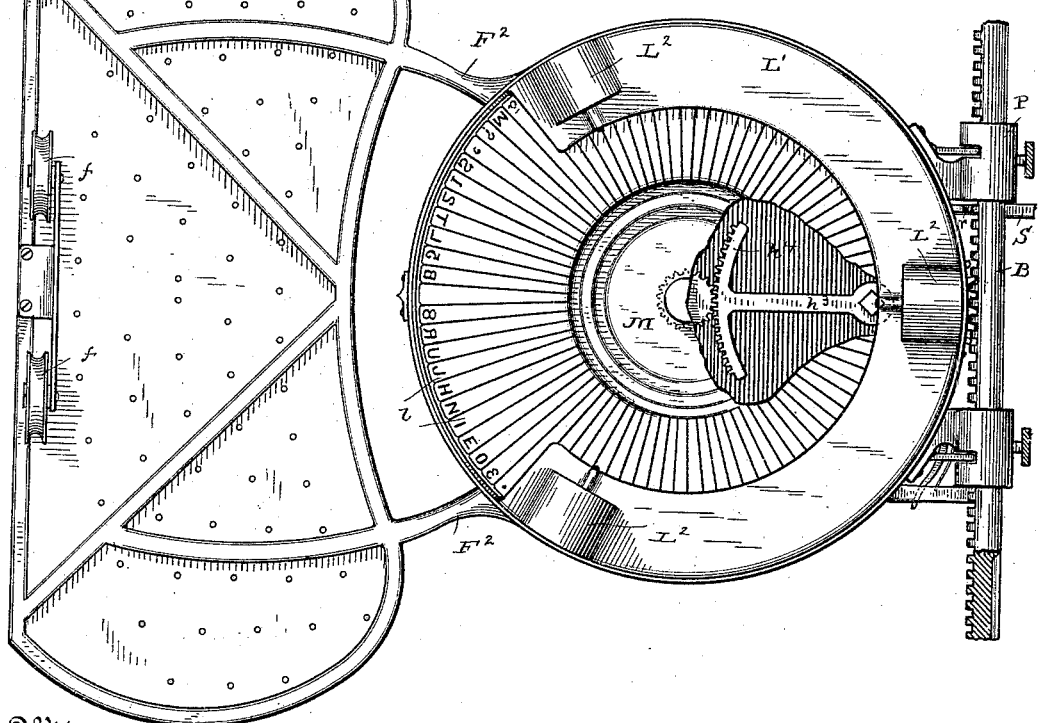
Witnesses
H. A. Lamb
C. S. Sturtevant
Inventor
W. Warrington Evans
By his Attorney
Frankland Jannus

UNITED STATES PATENT OFFICE.

WILLIAM WARRINGTON EVANS, OF WASHINGTON, DISTRICT OF COLUMBIA.

TYPE-WRITING MACHINE.

SPECIFICATION forming part of Letters Patent No. 445,398, dated January 27, 1891.

Application filed July 1, 1889. Serial No. 316,157. (No model.)

*To all whom it may concern:*

Be it known that I, WILLIAM WARRINGTON EVANS, a citizen of the United States, residing at Washington, in the District of Columbia, have invented certain new and useful Improvements in Type-Writing Machines, of which the following is a description.

My invention relates to improvements in type-writing machines of the class known as "one-handed machines;" and it consists in the various features of construction, arrangement, and operation hereinafter described, and referred to in the appended claims.

Figure 1:
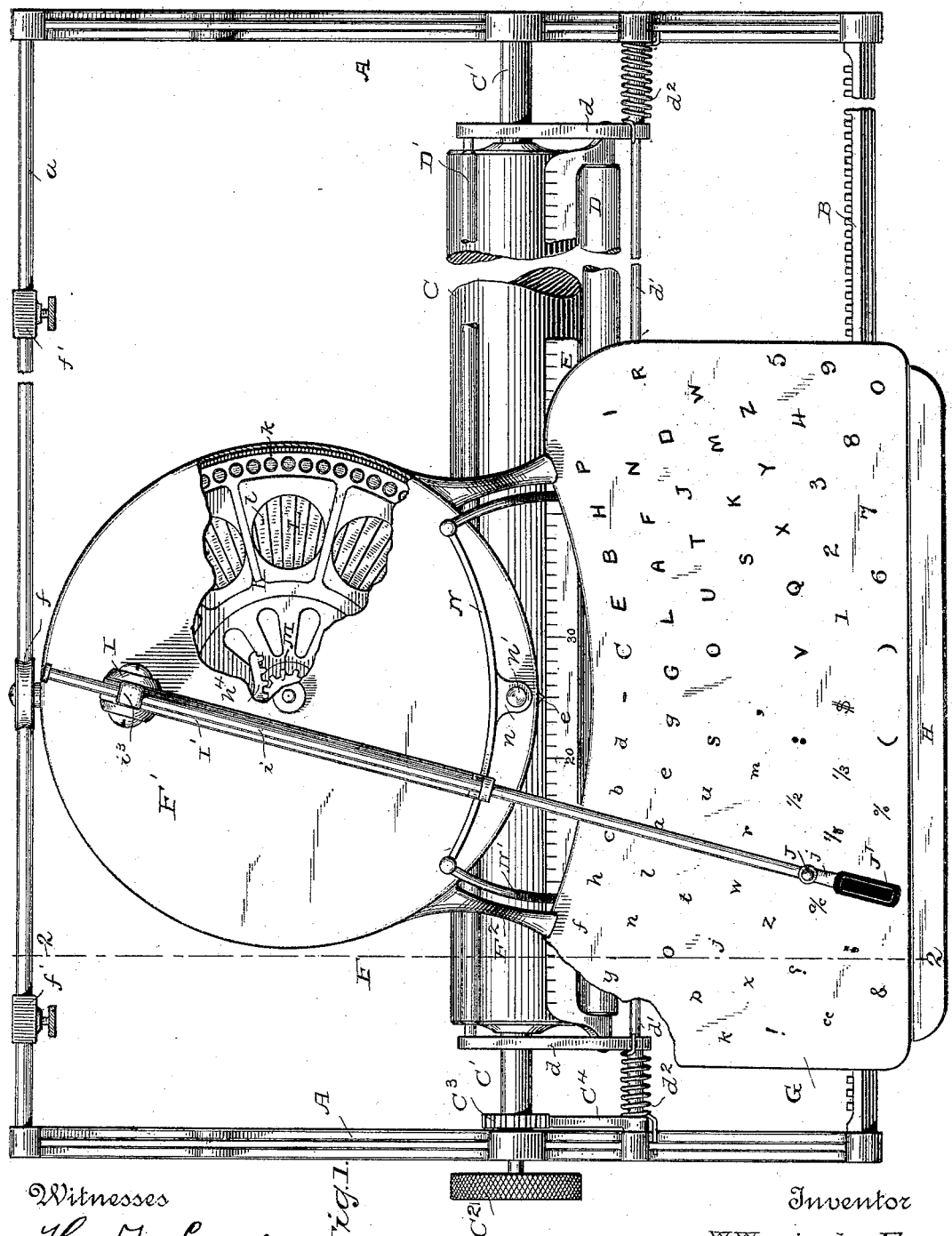
Figure 10:
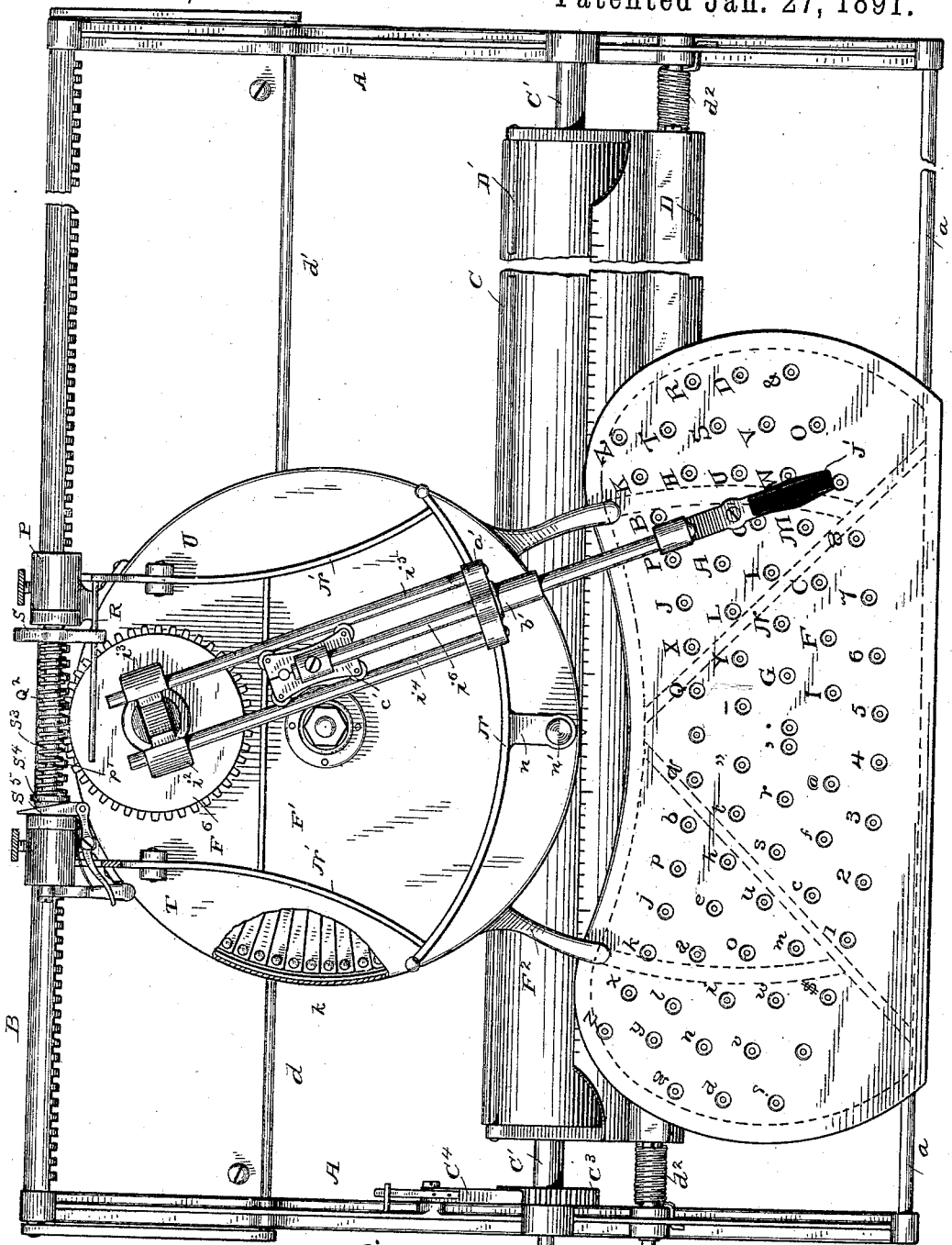

In the accompanying drawings, Figure 1 is a plan view of a type-writing machine embodying my invention. Fig. 2 is a transverse sectional elevation thereof on the line 2 2 of Fig. 1. Fig. 3 is an inverted plan view showing the escapement mechanism. Fig. 4 is a fragmentary view showing the escapement-releasing mechanism. Fig. 5 is a transverse sectional elevation showing a slightly-different form. Fig. 6 is an inverted plan view of the construction seen in Fig. 5. Fig. 7 is a fragmentary view of a portion of the escapement shown in Figs. 5 and 6. Fig. 8 is a sectional detail of the key-button seen in Fig. 5. Fig. 9 is a fragmentary detail of one of the side spacing-keys seen in Fig. 6. Fig. 10 is a plan view showing a slightly-different form of my invention. Fig. 11 is a transverse sectional elevation, and Fig. 12 an inverted plan of the construction seen in Fig. 10.

Similar letters denote like parts throughout.

As indicated in the drawings, the working parts of my improved type-writing machine are arranged within a light metallic frame comprising end pieces A A, which are united by a side rail $a$, and a rack-bar B, which latter is desirably only loosely secured in the extremities of the end pieces A A, so that it may turn freely therein.

C indicates a paper-supporting roller desirably having a covering of vulcanized rubber, the spindle C' of which is also journaled in the end pieces A A. A milled button $C^2$ is attached to the projecting extremity of the spindle C', affording a means whereby it may be turned as desired. The said spindle also carries a holding-ratchet $C^3$, which is engaged by a spring-pawl $C^4$, and while the paper-roller is readily rotated in either direction by means of the nut $C^2$ it is securely held in the desired position by the engagement of the pawl $C^4$ with the ratchet $C^3$.

D D' are small rollers mounted in opposite extremities of pivoted arms $d\,d$. The arms $d$ are supported upon a transverse rod $d'$, fixed in the ends of the frame and spring-pressed in the direction of the main paper-roller C by suitable springs $d^2$, by which the arms $d$ are pressed toward the main paper-roller C, thereby sustaining the paper-holding rollers D D' in engagement therewith.

To insert the paper the rollers D D' are lifted away from the paper-supporting roller and the paper sheet inserted between them, where it will be firmly held by the pressure of the said small rollers against the larger one. A graduated gage-plate E is also secured to the arms $d\,d$ and serves to further secure the paper in desired position, as also to indicate the spaces occurring between the printed characters.

The printing devices and means for propelling the same transversely of the paper-roller are carried upon an automatically-moving carriage F. As shown, the carriage F is composed of a disk-like front portion F', to which is attached a light but rigid metallic frame having arms $F^2\,F^2$ extending rearwardly and united by transverse arms $F^3\,F^4$, which form a light but substantial frame, upon which rests the key-board G. The frame $F^2\,F^2\,F^3\,F^4$ is further strengthened by a central rib $F^5$. A spring-box $F^6$, provided with gear-teeth on its periphery, is pivotally secured to the rib $F^5$, with its teeth in mesh with the rack upon the bar B, thereby communicating lateral motion to the carriage. The rack-bar B, being loosely secured at its ends, operates as a hinge upon which the carriage may be turned out of the way when it is desired to renew the paper and for access to the paper-roller. A grooved traction-wheel $f$ is pivotally attached to the outer portion of the part F' of the carriage and arranged to travel upon the side rail $a$, which is provided with adjustable stops $f'\,f'$, by which the extent of the travel of the carriage can be limited as desired.

As shown in Figs. 1 and 2, the key-board G consists of a flat surface provided with characters or letters, as clearly shown in Fig. 1, and the printing devices are brought to their desired operative position by such movement of the key-button and lever as will bring an indicating-point provided at the extremity of the key-lever directly over the character which it is desired to impress upon the paper, as will appear.

As shown in Fig. 1, a spacing-bar H, for actuating the escapement mechanism, is provided and desirably located along the lower edge of the key-board. I may also provide in substitution therefor, as shown in Fig. 6, spacing-keys H' H', located one at each side of the key-board. Near the outer portion of the upper end of the carriage is placed a vertical bearing $h$, in which is pivoted a hinge I, the stem or shank $h'$ thereof extending downward through the bearing $h$. The parts described constitue the hinged and pivoted portion of the telescopic key-lever, substantially as shown and described in my patent referred to below. A pair of parallel rods $i\ i'$ is secured at one end to a head J, which is provided with an extension $j$ at its lower portion, to which the key-button J' is secured. The parallel rods $i\ i'$ constitute the endwise-moving telescopic portion of the key-lever, the rod $i'$ passing through a tubular bearing I', and the rod $i$ passing through other bearings $i^2\ i^3$, formed in lugs extending from the extremity of the tubular bearing and upon the hinged pivot I, respectively. The head J is continued downward to form a pointer $J^2$, which projects into proximity with the characters upon the key-board to enable the operator to determine the proper positions for printing the respective characters. It may in some instances be desired to construct the key-board G as shown, described, and claimed in Letters Patent No. 374,046, granted to me November 29, 1887, in which event the head J is provided with a key-button for engaging the semi-spherical projections $g$. When so constructed, the key-button $j'$ is formed with a stem $j^2$, extending upward into a socket in the head J, which socket is provided with projections or formed with an inwardly-extending flange $j^3$ near its upper end. A coiled spring $j^4$ is wrapped around a reduced portion of the stem $j^2$, the extremity of which is secured beyond the extension $j^3$ and is held in position by a suitable screw or head $j^5$, as shown in Fig. 8.

On the interior of the part F' of the carriage is pivotally mounted what I have termed a "fly-wheel" K. The body of the wheel K is desirably of thin metal; but its periphery is thicker than the remaining portion and is provided with a closely-arranged annular series of vertical, funnel-shaped, or tapering guide-openings $k$. The fly-wheel K is also desirably provided with a rib $k'$ on its under side, to which rib is attached an annular slitted disk L. The disk L is formed of resilient metal and is slitted from its periphery to within a short distance of its inner circumference, so as to form an annular series of spring-arms $l$, corresponding in number to the guides $k$. The resilience of arms $l$ holds them normally up against the under side of the guides $k$. Printing characters $k^2$ are formed integral with the said arms and upon the under side of their outer extremities. The said characters are formed by stamping between suitable dies, the entire series of characters and the entire series of divisions between the spring-arms being desirably formed at a single operation, the two operations being combined in one or carried on separately, as may be most convenient. The under side of the said circular portion of the carriage is provided with an inwardly-extending flange L', which is cut away at and near its inner central portion directly over the center of the paper-roller and through which the character-bearing arms are depressed to effect the impression upon the paper. At suitable parts in the flange L' are formed depressions $L^2$, in each of which is placed a lining of felt or other absorbent material, upon which is seated a small inking-roller $L^3$, desirably formed of soft rubber. The size of the rollers $L^3$ and the depth of the wells $L^2$ are so proportioned that the types on the under side of the arms $l$ will come in contact with the periphery or peripheries of said rollers and impart rotary movement thereto. A supply of ink is deposited in said ink-wells, as required, and is transferred from the fibrous material to the inking-rollers, and as the fly-wheel and type-disk are rotated back and forth in the operation of printing the various types will come in contact with said rollers and be constantly supplied with ink. Upon the upper side of the fly-wheel K is fixed a small gear-pinion M, and upon the lower end of the stem or pivot $h'$ is attached an arm $h^3$, carrying a toothed sector $h^4$, engaging the pinion M. It will be understood that any radial movement of the key-button J' will be transmitted through the pivot $h'$, sector $h^4$, and pinion M to the fly-wheel and type-disk, causing them to turn to right or left in accordance with the direction of movement of the key-lever. The projections $g$ on the key-board are each provided with a suitable character so arranged that when the key-button is above or upon one of said projections the arm of the type-disk carrying the character corresponding thereto will be in the center of the printing-opening and in position to be pressed downward upon the paper. The desired character having been positioned for printing by the placing of the pointer above or the key-button $j'$ upon the proper letter or projection is depressed into contact with the paper by vertically moving plunger $m$, which is supported in a vertical bearing $m'$ in the top plate F' directly over the printing-point. A curved arm N, secured to pivoted arms N', is arranged in the path of the key-lever, preferably directly under the extremity of the tubular bearing I', which is re-enforced to resist the wear caused by constant movement thereupon. A lug $n$, projecting from a central portion of the arm N, carries an adjustable screw $n'$, bearing upon the head of the plunger $m$, and by which the depth of the impression may be adjusted.

Between the edge of the key-board G and the periphery of the disk F' exists an open space, through which the scale E is visible for a considerable portion of its length, and through which also the printed work can readily be seen. When the plunger is raised, the last character printed will be distinctly visible upon the paper. A pointer $e$ upon the part F' of the carriage, in conjunction with the scale E, indicates the position of the printing devices with respect to the paper upon the roller.

The escapement for controlling the operation of the barrel-spring $F^6$ is located beneath the key-board. A metallic block P is fitted to slide freely along the rack-bar B. The block P is provided with upwardly-extending arms $p$, between which is secured a shaft or bar $p'$. Upon the bar $p'$ is mounted a rocking lever S, which is provided with a downwardly-extending tooth $r$, adapted to engage the teeth of the bar B. The rocking lever S is also provided with a rearward extension or thumb-piece S', which when depressed will tilt the lever S and free its tooth $r$ from the rack-bar B, permitting the rearward movement of the carriage. A spiral spring $Q^2$ is mounted upon the bar $p'$ and is connected to the rocking lever S, so that it not only acts to move said lever longitudinally along the bar $p'$, but also acts torsionally thereon to normally keep the tooth $r$ in engagement with the rack B. A sleeve $S^2$ upon the bar $p'$ is attached to the rocking lever S and practically forms an elongated bearing therefor upon the bar $p'$. A short sleeve $S^3$, provided with an enlargement or collar, is located upon the opposite end of the bar $p'$, and sufficient space is left between the ends of the sleeves $S^2 S^3$, so that when the sleeve $S^3$ is at the greatest distance from the sleeve $S^2$ the longest movement ever desired between characters may be made.

In order to properly gage the spaces between the printed characters, I provide a longitudinally-movable wedge $S^4$, which is inserted between the rear end of the sleeve $S^3$ and the extension $p$, against which the said sleeve would otherwise rest. A pivoted lever $S^5$ is mounted upon the block P and serves as a convenient means for moving the wedge when it is desired to change the space between the printed characters. The inner face of the wedge $S^4$ is provided with two or more holes, each one adapted to engage a short stud or pin $S^6$, projecting from the inner face of the end of the block P. The wedge $S^4$ is readily moved from one position to another by its actuating-lever, and when positioned will be retained by the pressure of the spring $Q^2$, which will act to hold it against the inner face of the block P and in engagement with the pin $S^6$.

As shown in full lines in Fig. 3, the wedge $S^4$ has been inserted to an extent which will permit the compression of the escapement-spring $Q^3$ to its least extent only, making the short space between characters. By moving the lever $S^5$ to the position shown in dotted lines it will be obvious that the ends of the sleeves $S^2 S^3$ will be further separated and greater movement of the parts permitted each time the printing mechanism is operated. An extension or lug $S^7$ is provided upon that end of the block P which is adjacent to the rocking lever S, the said lug $S^7$ being in proximity to the extension S'. When it is desired to move the carriage rearwardly, so as to repeat a character, make a correction, or to begin a new line, the lug S' and extension $S^7$ are grasped within the thumb and finger of the operator, which action will move the tooth $r$ away from the rack B, thereby releasing the carriage, which may then be moved forward or backward to any desired extent, the spring $Q^2$ causing the tooth $r$ to again engage the rack whenever pressure is removed from the extension S'.

In Figs. 5, 6, and 7 a slightly-different form of escapement mechanism is illustrated, the same being constructed as follows: The block P, as here shown, is provided with inwardly-extending arms P' and outwardly-extending arms $p$. To one of the arms $p$ is rigidly attached a stem $p'$, the other arm $p$ being internally screw-threaded and provided with a socketed screw-bolt Q. The extremity of the stem $p'$ fits into and is supported by the screw Q. A sleeve Q' fits over the stem $p'$ and carries a small light metallic dog or rocking lever S, which extends inwardly over the bar B and is provided with a downwardly-extending tooth $r$, capable of vertical movement between the teeth on the bar B. A light spiral spring $Q^2$, for advancing the dog S when released, is wound over the stem $p'$ and sleeve Q', as shown in Figs. 2, 3, 5, and 6. Levers R' R', having short arms arranged to engage the teeth of the rack B and longer arms extending inwardly, are pivoted to the arms P'. The short arms of the levers R' are united by a rod R, which engages the inner end of the dog S for lifting the same when the outer ends of said levers R' are depressed, and the long arms of the said levers R' are united by a transverse bar $S^8$, the levers R' R' and rods R $S^8$ together forming a rigid rectangular frame pivotally supported by the arms P' P'. The arms N', extending rearwardly and downwardly from the plunger-actuating curved arm N, pass under the key-board, but over the bar $S^8$, and are pivotally supported in suitable extensions $N^2$, so that whenever the key-lever is depressed the said arms will depress the rod $S^8$, raise the inner ends of levers R' into engagement with the rack, simultaneously lifting the dog S, and by freeing its tooth $r$ permit it to move forward into position to engage the next tooth and to permit the spring to move the carriage up to it as soon as the levers R' are released from the rack-bar by the raising of the key-lever and arms N'. The spacing-bar H is provided with pivoted levers $h^3$, extending inwardly and engaging other levers $h^4$, acting upon the cross-bar $S^8$, so that each depression of the bar H will cause a corresponding depression of the bar $S^8$ and a movement of the escapement mechanism. Instead of the bar H the keys H' H' are used, said keys being provided with stems $H^4$, extending downwardly through the key-board and connected with levers $H^2$, which are also pivotally supported in the extensions $N^2$, with their outer ends resting also upon the upper side of the rod $S^8$. A small spring $y$ serves to sustain the weight of the spacing-key and its lever $H^2$, so that when the key-lever is depressed the escapement mechanism will be actuated by the arms N' without having to drag the arms $H^2$ with them, and when either of the space-keys is operated it will depress the bar $S^8$ and actuate the escapement without also actuating any of the other parts, thus reducing the power required to effect any of the movements. As shown in Figs. 2, 5, and 6, the key-lever has been depressed and a type impressed upon the paper. In this position the rod $S^8$ is depressed by the rods N' and the free ends of the levers R forced upward into engagement with the teeth of the bar B. As soon as these levers fairly engage the rack the bar R raises the outer end of the dog S and frees its tooth $r$ from the rack-bar, at which moment the dog S is by its spring $Q^2$ moved forward until stopped by the inner end of the screw Q in Fig. 7 or the collar on the sleeve $S^3$ in Fig. 4. If now the pressure upon the bar R is removed, the levers R' will be lowered, and the tooth $r$, having been advanced by its spring, will descend into engagement with a tooth or teeth in advance of its last position, and when the levers R' shall be entirely disengaged from the bar the stronger box-spring $F^6$ will exert its force in opposition to the spring $Q^2$. The carriage is moved forward under the influence of the stronger spring until the spring $Q^2$ is fully compressed, the sleeve Q' or $S^2$ is slid rearward upon the stem $p'$, and the carriage F is advanced the distance through which the said spring was compressed. The forward movement of the carriage at each stroke is exactly the same as the forward movement of the dog S when released by the levers R'. Therefore by adjustment of the screw Q or the wedge $S^4$ it will be caused to arrest the forward movement of the dog at such a point as will cause the feeding devices to move the carriage through one space, two spaces, or more with each movement of the parts.

While the forms of my invention illustrated in the first nine figures of the drawings are useful and practicable, yet for several reasons, principally greater simplicity and compactness, the manner of constructing the various parts of my improved type-writing machine shown in Figs. 10, 11, and 12 may be preferred. The position of the escapement mechanism may be reversed or otherwise changed without departing from the invention, and it has been found by experiment that by placing it upon the front of the carriage and above instead of below the printing mechanism good results are attained. Further changes have been made in the details of construction, all of which are, however, but developments of the present invention.

The first change, which is clearly another form of the device shown in the previous figures, consists in a somewhat different mode of constructing the telescopic key-lever. This different form is shown in Figs. 10 and 11 in plan and side elevation, respectively. It consists of two parallel rods $i^4 i^5$, secured at one end to a casting $a'$, having a hollow tubular extension $b'$ resting upon the bar N. At their other ends the rods are attached to the lugs $i^2 i^3$ upon the hinge I, pivoted in the vertical bearing $h$, the stem of said hinge extending downwardly through the bearing $h$ and spring $F^6$, being connected with the type-actuating mechanism through the arm $h^3$, toothed sector $h^4$, and gear M, as heretofore described. These two rods $i^4 i^5$ are incapable of longitudinal movement, but act as guides upon which a frame C', provided with grooved rollers, slides. Rigidly secured to it is one end of a rod $i^6$, passing through the tubular bearing $b'$ and attached at its opposite end to one end of a bent arm $j$, upon the opposite end of which is the key-knob J'. Near the central part of the arm $j$ is attached a vertical post J, which is continued downward into proximity with the characters on the key-board, being rounded at its lower end and formed with a lug $d^3$ thereupon, adapted to fit openings formed in the bottom of saucer-shaped depressions in the key-board. It will be seen that this form of depressions and the form of the end of the post differ from those shown in previous figures, and the advantage thereover will be perfectly apparent, the depressions acting to guide the lug $d^3$ to the desired position even when not accurately positioned by the hand of the operator.

In Fig. 11 is clearly shown the modified structure of printing devices. The casting containing these devices is of substantially the same construction as shown in Fig. 5. Instead, however, of using the fly-wheel K and attaching the type-disk thereto, said type-disk is pivoted within the casing in the manner shown in Fig. 11. The type are formed on the radial spring-arms of the disk in the manner aforesaid, and upon the upper side of each of these arms above the letter is formed a conical pin Z, fitting a conical opening formed, as shown in said figure, in the end of the plunger $m$, whereby the type become self-centering. In the form of machine shown in Figs. 11 and 12 the rack-bar B and roller $f$ are placed in exactly the reverse positions from those occupied in the remaining figures of the drawings. This change in position of the rack-bar necessitates a change in the position of the spring-box and the other parts which are in connection with the rack-bar. The box $F^6$ is placed upon top of the casing which contains the type-disk, being pivoted to the shank of the pivot I, the teeth upon the outside of said box engaging with the teeth of the rack-bar. To the bar N are secured inclined bars N', extending downwardly toward the front of the machine and pivoted at T to lugs U upon the portion F' of the carriage. These bars are extended beyond the pivotal point, forming levers R', exactly similar to those shown in Fig. 5, and adapted to engage the teeth of the bar B, and through the medium of the connecting-rod R acting upon the rocking lever S in the manner already described. With the exceptions above noted the construction of the apparatus and the operation of the same are exactly similar in all respects to that illustrated in the other figures of the drawings. It will be readily seen that the form of telescopic key-lever shown in the first nine figures of the drawings may be substituted for that shown in Figs. 10, 11, and 12, and vice versa.

I have described the constructions shown with such particularity for the purpose of this specification only, since various modifications and changes may be made in many of the parts without departing from the spirit of my invention.

Having described my invention, what I claim, and desire to secure by Letters Patent, is—

1. A type-disk for type-writers, consisting of a disk of sheet metal slitted radially to form spring type-bearing arms, in combination with conical guides located above the extremities of the said type-bearing arms, and a movable plunger for forcing down said type-bearing arms, adapted to register with the guides, substantially as described.

2. A type-disk for type-writers, consisting of a disk of sheet metal slitted radially to form spring type-bearing arms and having printing characters formed integral with the extremities of said arms, combined with conical guides located above the extremities of the said type-bearing arms, and a movable plunger for forcing down said type-bearing arms and adapted to register with the guides, substantially as described.

3. A type-disk for type-writers, consisting of a disk of sheet metal slitted radially to form spring type-bearing arms and having printing characters formed integral with the extremities of said arms upon one side and conical pins formed integral with said arms upon the other side, and a movable plunger for forcing down said type-bearing arms and adapted to register with the pins, substantially as described.

4. The combination of a type-disk for type-writers, consisting of a disk of sheet metal slitted radially to form spring type-bearing arms, and a fly-wheel provided with an annular series of funnel-shaped guide-openings located above the extremities of the type-bearing arms, substantially as described.

5. The combination of a type-disk for type-writers, consisting of a disk of sheet metal slitted radially to form spring type-bearing arms, and a fly-wheel provided with an annular series of funnel-shaped guide-openings located above the extremities of the type-bearing arms and formed with a depending flange upon which the type-disk is removably secured, substantially as described.

6. In a type-writer, a telescopic key-lever hinged to move vertically and pivoted to swing horizontally, a disk carrying suitable type and rotatably mounted on its axis, and a suitable connection between the pivot of the key-lever and the axial support of the type-disk, substantially as described.

7. In a type-writer, the combination, with a hinged and pivoted telescopic key-lever, of a pivoted fly-wheel, a disk of sheet metal slitted radially, thus forming spring type-bearing arms, and secured to said fly-wheel, and suitable gearing extending between the pivot of the key-lever and the axial support of the fly-wheel.

8. In a type-writer, the combination, with a hinged and pivoted telescopic key-lever, of a rotatably-mounted type-disk, connections between the pivot of the key-lever and the type-disk for rotating the latter, and a key-board arranged at the front of the machine remote from the type-disk and provided with indicating characters or signs, whereby the end of the key-lever remote from its pivotal point is guided, all the characters on the key-board being arranged on separate radial lines, substantially as described.

9. In a type-writer, a key-lever comprising a hinged and pivoted support, parallel guide-rods secured at one end to said pivoted hinge and at their other end to a head $a'$, said head having a central tubular opening, a frame sliding between said guide-rods, and a rod passing through said tubular bearing attached at one end to said frame, an arm $j$, attached to the opposite end of said rod, said arm being provided with a downwardly-projecting pointer, and a finger-piece J', substantially as described.

10. In a type-writing machine, a key-lever provided with a downwardly-projecting pointer, in combination with a key-board having indicating characters or signs on its surface, said key-board being provided with openings corresponding to the characters on its surface, said openings being surrounded by saucer-shaped depressions, substantially as described.

11. In a type-writer, the combination of a rotatably-mounted type-disk having guides located above the extremities of the arms of the type-disk, a pivoted key-lever having a toothed sector secured to the pivot thereof, and an intermeshing pinion on the axis of the type-disk, whereby said disk is rotated in accordance with the movement of the lever.

12. In a type-writer, the combination of a rotatably-mounted type-disk and fly-wheel containing guide-openings located above the extremities of the arms of the type-disk, a pivoted key-lever having a toothed sector secured to the pivot thereof, and an intermeshing pinion on the fly-wheel, whereby the fly-wheel and type-disk are rotated in accordance with the movement of the lever, substantially as described.

13. In a type-writing machine, a hinged and pivoted telescopic key-lever, a rotatably-mounted type-disk and connections between the same and the pivot of the key-lever for rotating said type-disk, said type-disk being arranged to form type-bearing arms with a series of guides arranged thereon, and a vertically-movable plunger in the path of the key-lever, whereby the characters for printing will be positioned by the key-lever and the depression of the same will force the plunger into engagement with the guides to perform the printing, substantially as described.

14. In a type-writing machine, in combination with a suitable supporting-frame, an intermittently-moving carriage containing the printing and feeding mechanism, said carriage being constructed in two parts connected by frame-pieces, one of said parts carrying the printing mechanism and the other part the mechanism whereby the carriage is fed, substantially as described.

15. In a type-writing machine, the combination of a slitted type-disk having arms provided with printing characters and having an annular series of funnel-shaped openings arranged above said arms, a hinged and pivoted telescopic key-lever geared to said type-disk, whereby the disk and guide openings are suitably rotated in accordance with the movements of said key-lever, a vertically-moving plunger in the path of the telescopic key-lever, and a key-board having indicating characters or signs to guide the extremity of the key-lever, said characters being each located upon a separate radial line with respect to the path of the key-lever.

16. In a type-writing machine, in combination with a suitable frame, a paper-roller supported thereby, a scale, an intermittently-moving carriage containing the printing and feeding mechanism, said carriage being constructed in two parts, one part carrying the printing mechanism and the other the feeding mechanism, suitable arms uniting the two parts of the carriage and bridging the paper-roller, and a pointer located in the space between the parts of the carriage opposite the printing-opening and in juxtaposition to the scale, substantially as described.

17. In a type-writing machine, the combination, with the frame, of the carriage and the rack-bar, a box-spring secured to the carriage and engaging the teeth of the rack-bar, a block arranged to slide upon the rack-bar and provided with a rocking lever or spring-dog normally engaging the rack-bar, and a pair of pivoted levers on the opposite side of the block normally out of engagement with the rack-bar and provided with means for releasing the dog when their outer extremities are depressed to bring their inner ends into engagement with the teeth of the rack-bar, and connections between said lever and the printing mechanism, whereby they are depressed at each operation thereof.

18. In a type-writing machine, the combination, with the main supporting-frame and the rack-bar pivotally mounted thereon, of a block P, arranged to move laterally upon said rack-bar, a box-spring secured to the carriage and provided with teeth on its periphery engaging the rack-bar, a rocking lever or spring-dog carried by the block and also engaging the teeth of the rack-bar, a pair of levers pivoted to the block and secured to a transverse bar $S^3$ and arranged to engage the rack-bar when their outer ends are depressed and to simultaneously raise the spring-dog out of engagement therewith, and arms extending downward from the plunger-arm and resting upon the transverse bar $S^8$, whereby when the plunger is depressed in the operation of printing the downwardly-extending arms will depress the said bar $S^8$ to release the spring-dog and operate the escapement, substantially as described.

19. In a type-writer, the combination, with the intermittently-moving carriage thereof, of a rack-bar, a box-spring secured to the carriage and provided with teeth upon its periphery engaging the teeth of the rack-bar, a block secured to the carriage and arranged to slide upon the rack-bar, an endwise-moving rocking lever or dog mounted between arms projecting from one side of the block and extending over the rack-bar and into engagement therewith, vertically-moving pivoted levers, also attached to the block and arranged when their outer ends are depressed to engage the teeth of the rack-bar and to disengage the dog, permitting the same to advance the desired distance while the carriage is held by the pivoted levers, and means for regulating the advance of the spring-dog, substantially as described.

20. In a type-writing machine, the combination, with the escapement mechanism, of spacing-keys attached to pivoted levers normally resting upon but not secured to a downwardly-moving operative part of the said escapement mechanism, substantially as described.

21. In a type-writing machine, a carriage propelling a printing device, a type-disk pivotally mounted in one portion thereof, and a flange or support arranged below said type-disk and formed with a plurality of depressions, said depressions being provided with a lining of fibrous material, as felt, and a flexible roller arranged therein and adapted to come in contact with the faces of the printing characters as said type-disk is rotated, substantially as described.

22. In a type-writing machine, the combination of the carriage, the rack-bar, a rocking lever or spring-dog normally carried by the carriage and engaging the rack-bar, means, substantially as described, for disengaging the dog at each operation of the printing mechanism, and a movable wedge for limiting the travel of the dog and determining the space between each printed character, substantially as described.

In testimony whereof I hereto affix my signature in presence of two witnesses.

W. WARRINGTON EVANS.

Witnesses:
R. E. L. WILTBERGER,
E. J. EVANS.